United States Patent Office 3,238,568
Patented Mar. 8, 1966

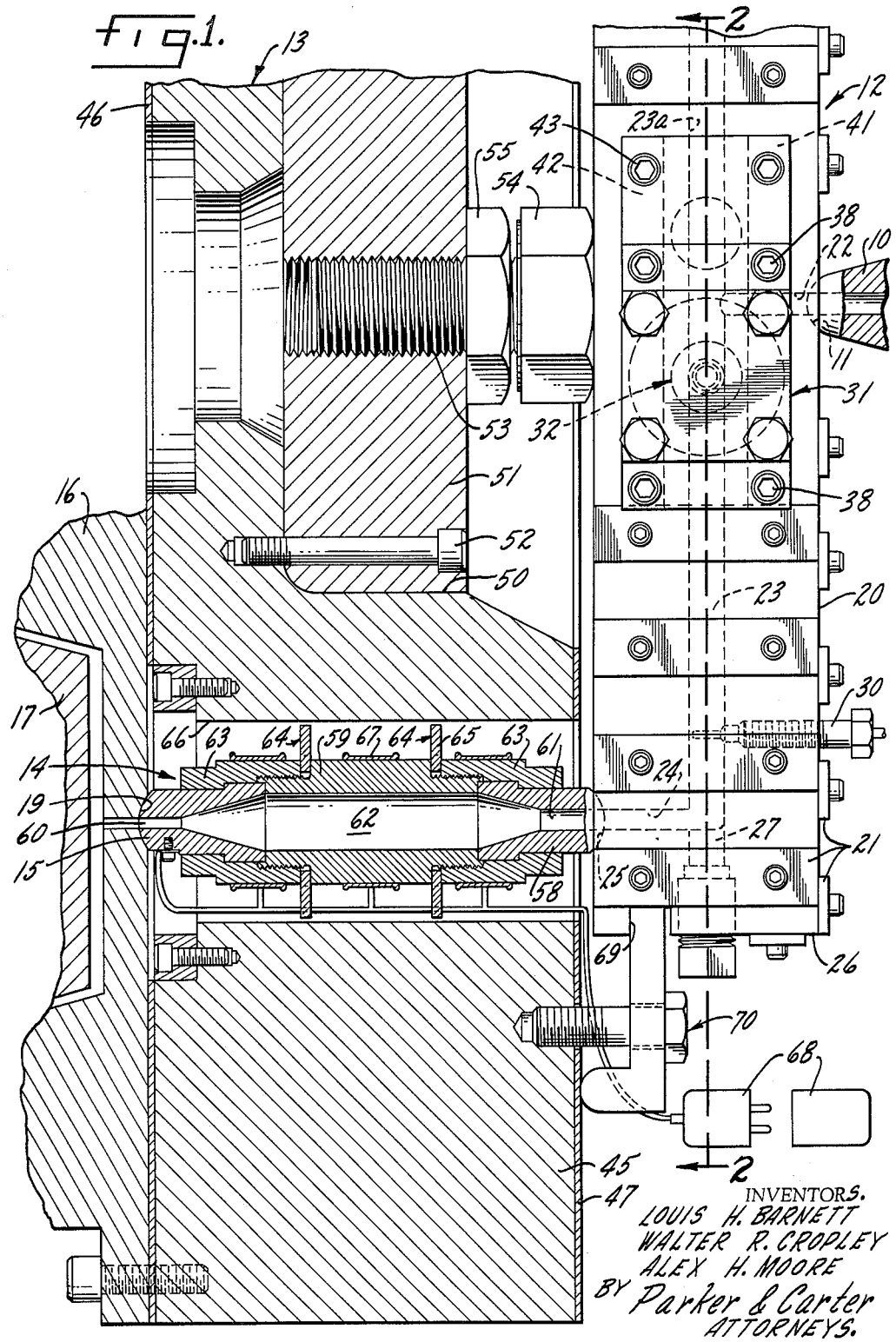

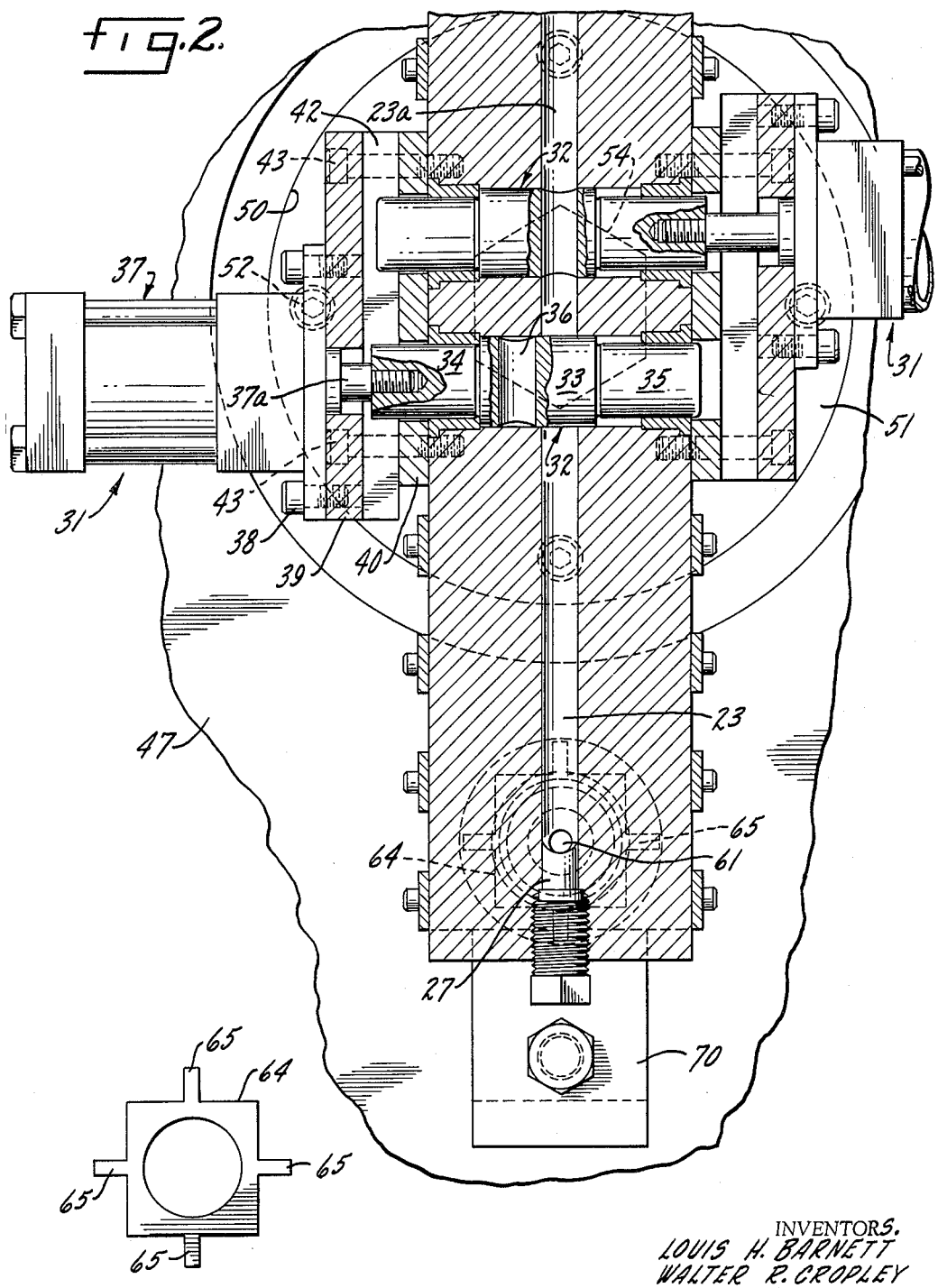

3,238,568
MULTIPLE NOZZLE ARRANGEMENT FOR
MOLDING MACHINES
Louis H. Barnett, Walter R. Cropley, and Alex H. Moore, Fort Worth, Tex., assignors, by mesne assignments, to Barnett Research & Development Company, Fort Worth, Tex., a limited partnership
Filed June 17, 1963, Ser. No. 288,153
6 Claims. (Cl. 18—30)

This invention relates generally to injection molding machines, and particularly to such a machine having a plurality of molds each of which is connected to a common source of injection material by a manifold.

Accordingly, a primary object of the invention is to provide a machine having a plurality of molds for making similar or dissimilar objects of equal or unequal weight.

Another object is to provide a flow control system for an injection molding machine manifold, the flow control system being simple, easily constructed and removably connectable to the hot platen so that no special sizing operations are needed when mold changes are made.

Another object is to provide a manifold for a multi-nozzle injection machine which may be easily and simply flushed of residue whenever a change in color or composition of mold material is desired.

A further object is to provide a multi-nozzle attachment for a multi-nozzle injection molding machine having means for relieving the pressure from the injection cylinder nozzle to thereby maintain the separate parts forming the fluid flow path from the source to the molds in tight, abutting engagement with one another.

Yet a further object is to provide a floating nozzle assembly for use in a single or multi-nozzle injection molding machine which is easily adjustable in length, in which expansion and contraction due to heating can be quickly and simply accommodated and which is able to be injected through the nozzles in any sequence, or simultaneously.

Another object is to provide a machine for sequential or simultaneous molding of a plurality of similar or dissimilar objects.

Yet a further object is to provide a mold structure in which heat transference is minimized from a heated manifold to the stationary platen and mold whereby rapid cooling in the mold can be effected and production correspondingly increased.

Yet a further object is to provide a multi-nozzle attachment for an injection molding machine having interchangeable parts and which can be easily and positively balanced to maintain uniform pressure between each nozzle and the manifold even though there be small dimensional differences from part to part.

Another object is to provide an injection manifold in which leakage is confined to one small area.

A further object is to provide a method of lubricating the control members in a multi-nozzle injection molding machine manifold which thereby reduces the danger of breakage of high pressure parts of the machine.

Another object is to reduce leakage in the nozzle areas in a multi-nozzle injection molding machine by relieving the pressure on a hot manifold due to the pressure exerted by a supply injection nozzle and the pressure of the injected material.

Other objects and advantages will become apparent upon reading of the following description of the invention:

The invention is illustrated more or less diagrammatically in the accompanying drawings wherein—

FIGURE 1 is an elevation of a portion of an injection molding machine illustrating my invention;

FIGURE 2 is a section taken substantially along the line 2—2 of FIGURE 1; and

FIGURE 3 is a view of a typical spacer member used in the nozzle assembly shown in FIGURE 1.

Like reference numerals will be used to refer to like parts throughout the following description.

An injection cylinder nozzle in communication with a source of injection material is indicated at 10 in FIGURE 1. The nozzle is received within a nozzle seat 11 formed at the approximate mid-point of a runner manifold indicated generally at 12. Although the nozzle and manifold are shown separable, they may be made solid or integral by threading or welding the parts to one another. The exact arrangement is within the option of one skilled in the art. The manifold in turn is clamped to the stationary platen 13 of an injection molding machine. The stationary platen receives a plurality of nozzle assemblies 14 only one of which is shown in FIGURE 1.

The nozzle tip 15 at the discharge end of the nozzle assembly is seated within a nozzle seat 19 formed in female half 16 of a two part mold, mold half 16 being secured by any suitable means to platen 13. The male half is indicated at 17, the mold halves forming therebetween a mold cavity 18 which, in this instance, and merely by way of example, is adapted to form a hollow molded object, such as a waste basket or garbage can.

The runner manifold 12 includes a housing 20 to which a plurality of heating elements 21 are secured, or implanted, to maintain the housing at a desired temperature. An entry runner or entering passage 22 is formed in the approximate mid-point of the housing, the passage being generally aligned with the center of nozzle seat 11. Passage 22 in turn opens into a pair of runners 23, 23a, which, in this instance, are disposed 180° from one another. In this instance each runner extends substantially perpendicularly to the entering passage 22 and includes a terminal portion 24. A nozzle seat 25 is formed in the exit opening or each terminal portion 24. Since the manifold is symmetrical about a center line, only one runner and its associated structure is shown in detail. It should be understood that the runner need not be arranged exactly as shown, the angularity of the runners with respect to one another and to entering passage 22 being variable in accordance with the number of nozzle assemblies used and other factors.

Preferably each runner is formed by boring from the top or bottom 26 of the manifold. The bottom opening is then sealed by inserting a brass plug 27, the inner end of which is contoured to form a streamlined surface at the junction of the terminal portion 24 and runner 23. Optionally the manifold could be made in two or more sections and welded or bolted together. It should be understood that it is quite within the scope of our invention to additionally secure the brass plug to the housing manifold by a safety block or other means. A thermocouple, indicated generally at 30, is used in a conventional manner to measure and regulate the temperature of the manifold.

Flow control means for blocking or permitting flow of injected material under pressure through the manifold is indicated generally at 31. The flow control means includes a pair of slide valves, each of which is actuated by a fluid cylinder, preferably a pneumatic cylinder. Since each valve is substantially identical, though reversed in position, only one will be described. Alternately, the valves could be spring loaded, or a pressure relief or electrically timed arrangement used.

Each flow control member includes a valve rod 32 which has a large diameter mid-section 33 terminating at its ends in reduced diameter sections 34, 35. Center section 33 is apertured as at 36, the aperture being of approximately the same diameter as runner 23. Although the valve rods are shown perpendicular to runners 23, 23a, they may be angled if there is insufficient mounting area, as might occur when, for example, three nozzle assemblies 14 are used. Further, the center section 33 of each valve rod may be necked down to provide flow around the rod rather than through it. One end of the valve rod, in this instance end 34, is connected to the piston rod 37a of a fluid pressure cylinder assembly 37. The cylinder is secured by bolts 38 to a cylinder mounting plate 39 which is spaced from a back-up plate 40 by a pair of parallels 41 and 42. Bolts 43 connect the cylinder mounting plate, parallels and back-up plate to the housing 20. The parallels helps to maintain the valve rods in alignment as they are reciprocated a distance sufficient to bring the aperture 36 into and out of registry with runner 23.

The platen 13, which is preferably a stationary platen, consists of a main or body section 45 and a pair of face plates 46 and 47. The function of the face plates is to reduce heat transference from the hot or runner manifold 12 and thereby to the mold halves 16 and 17. The face plates are preferably made of stainless steel or any other material having substantially similar heat insulating properties, such as fibreglass sheet plastic impregnated with insulation asbestos. If the manifold heaters are implanted in the manifold an insulating sleeve may be placed around the manifold.

A recess 50, which is preferably circular, is formed in the middle of the platen on the runner manifold side. A support block 51 is received in the recess and secured to the platen by bolts 52 or any other suitable securing means. The center of support block 51 is apertured as at 53 and a large hex head bolt 54 is threadably received in the aperture 53. A jam nut is indicated at 55. Any suitable spacer or spacers may be received between the top of the jam nut and the bottom of the head of bolts 54. Although the exact configuration of the support block and even the shape of the bolt or abutment member 54 may be varied, the location of the abutment member is preferably such that it is substantially directly aligned with the injection cylinder nozzle 10.

The nozzle assembly 14 includes nozzle tip 15 at the discharge end of the assembly, nozzle tip 58 at the entering end of the assembly, and nozzle extension 59 which maintains the nozzle tips in spaced relation to one another. The nozzle tips include orifices 60 and 61 respectively, each orifice diverging in an inward direction, the orifices being aligned with a passage 62 formed within the nozzle extension 59. Each nozzle tip is secured to the nozzle extension by a tip nut 63 or any other suitable means such as a wedge or welds. A spacer member or guide spider, whose outline is indicated best in FIGURE 3, is indicated at 64. The guide vanes or fingers 65 terminate a slight distance inwardly from the opening 66 in the platen within which the nozzle assembly is received. The primary functions of spiders 64 are to serve as a guiding and aligning means during insertion of the nozzle assembly into passage 66 and to provide an air gap to minimize heat transfer from the nozzle assembly to the platen. It should be understood that the spider-like configuration is merely exemplary and it may be desirable to make the member hexagonal or round or any other convenient shape.

A number of heating elements 67 which are connected to a suitable source of electric current through quick disconnect plug and jack assembly 68 maintain the nozzle assembly at any desired temperature.

The bottom 26 of the manifold is apertured to form a ledge 69 and a plurality of clamp assemblies 70 secure the hot manifold to the platen. Any other suitable means such as elongated holes, dowels, etc. could be employed.

The use and operation of our invention is as follows:

The nozzle assemblies 14 are spaced from the internal periphery of passages 66 in stationary platen 13. The female half 16 of the mold assembly is then secured to the stationary platen by any suitable means, and the runner manifold 12 is secured to the opposite side of the platen by clamp assemblies 70. The spiders 64 maintain the nozzle tips 15 and 58 in approximate alignment with the nozzle seat in the mold half 16 and runner manifold 12 during assembly.

Once assembled the injection cylinder nozzle 10 is brought into tight abutting engagement with runner manifold 12 as shown in FIGURE 1. Ordinarily additional pressure is applied in an effort to draw injection nozzle 10 very tightly against the runner manifold 12, and this pressure tends to bow the runner manifold. In this instance however the support member 54 is adjusted to a position at which it abuts the rear side of the runner manifold. The greater the force of the injection nozzle 10 against the runner manifold 12 the greater will be the counter balancing resisting force exerted by the hex head bolt 54. This counter balancing force tends to relieve pressure at the nozzle-manifold junctions, and maintains a tight seal.

Molten injection material is injected under pressure into the runner manifold 12. Since any suitable injection mechanism may be employed, they are not further illustrated or described. The kinetic energy of the molten injection material strikes the runner substantially directly in line with the entering passage 22. The hex head bolt 54 resists the additional force created by the kinetic energy of the molten injection material.

If it is desired that the material be injected directly into the molds under the injection pressure, each valve rod is moved to a position in which its aperture 36 is aligned with its associated runner 23 or 23a. The molten material then traverses the runners 23, 23a and into the mold or molds through nozzle assemblies 14.

The primary use of the assembly will be for sequential molding. In a sequential molding cycle, one valve rod is moved to a position in which the solid portion of center section 33 blocks its runner. The injection pressure then forces the molten injection material through the other valve rod whose aperture is aligned with the opposite runner and into the mold cavity at the end of the fluid flow path which includes runner 23a.

Alternately, both valve rods 32 can be moved into a position in which they block passage of injection material through their associated runners and a pressure build up between the injection cylinder and the valve rods. When a desired pressure is reached, one or both valve rods are opened and the material then flows through the runners and into the mold cavities. Alternately, both rods can be closed, one opened, and its associated cavity filled, and, as soon as filling is complete, the first one closed and a second, or a second and third, opened.

The particular valve sequence would depend upon whether a conventional molding cycle or a variation of a sequential molding cycle is desired.

A great advantage of our construction is that a single manifold provides great flexibility and a wide choice of molding operations. Further, the manifold can be quickly and easily disconnected and replaced with another manifold without disturbing the nozzle assemblies. In addition, the nozzle assemblies float at all times between the mold cavity and the runner manifold. Should unequal dimensional changes occur due to expansion or contraction of the parts from increases or decreases of heat, the length of the nozzle extensions can be quickly and easily adjusted by substitution of nozzle extensions of appropriate length.

The clearance between the mid-portions of the valve rods and their receiving cylinders is important. Preferably the clearance is on the order of about .003" or less. With this clearance injected material may ooze or, in effect, be extruded about one valve rod when the other is in the open position. This clearance acts as a safety valve to prevent the build-up of excessive pressure in the machine. This is especially important since it may save breakage of an expensive injection cylinder.

Another great advantage of our machine resides in the fact that the valve rods are not located in the nozzle assembly or even in the terminal portion of the manifold runner. This is important because no special sizing is needed when a mold change is desired. In addition, flushing of the manifold is much easier with the valve rods in this position if it is desired for example to change the color or type of molding material.

Although we have shown and described two nozzles, three nozzles may be used just as easily. In fact, certain aspects and features of the invention are not limited to any particular number of nozzles. On the other hand, certain other features of the invention may be best employed in a balanced nozzle arrangement which preferably would be two or three nozzles. Certain other features of the invention are best used with an odd number of nozzles for stability and balance.

Another advantage is that great interchangeability can be built into the machine. That is, one mold which accepts a charge of 11 ounces, another which accepts a 6 ounce charge and another which accepts a 3 ounce charge may be used simultaneously. The first mold could be 6" deep, the second mold 12" deep, and the third mold 5" deep. In other words, the depth or size or capacity is not in any way limited by this construction. In such a three shot mold, and using a sequential molding process, the 3 oz. shot could first be admitted and then either a 6 oz. or an 11 oz. shot to completely exhaust a 20 oz. capacity injection cylinder. As a matter of fact, any order of injection may be employed.

Although we have illustrated and described a preferred embodiment of our invention, it will at once be apparent to those skilled in the art that the scope of the invention is not limited by the above exemplary description. Rather it is our intention that the scope of the invention be limited only by the scope of the claims as interpreted in light of the pertinent prior art.

We claim:

1. An injection nozzle assembly for use in an injection molding machine having an apertured, nozzle assembly carrying member such as a platen, said nozzle assembly including, in combination,
    an admission nozzle tip, said nozzle tip having an entering orifice,
    a discharge nozzle tip, said nozzle tip having a discharge orifice,
    extension means for maintaining the tips in spaced axial relation to one another, said extension means having a passage therethru generally aligned with the orifices in the nozzle tips to thereby form an unobstructed fluid flow path from end to end of the assembly,
    means for securing the tips to the extension means and at least one aligning and guiding member extending generally radially outwardly from the extension means a distance slightly less than the aperture in the nozzle assembly carrying member within which the nozzle assembly is located.

2. For use in an injection molding machine manifold assembly having a housing and passage means adapted for communication, at its entry, with a source of molten material to be injected under pressure and, at its exit, with mold means,
    a flow control assembly in the passage means effective to control flow through the passage means, relieve excess pressure within the passage means, and continuously lubricate the flow control assembly at normal injection pressures, said flow control assembly including
    a valve member lying athwart the passage means which, when in blocking registry with the passage means obstructs flow therethrough, and
    means for moving the valve member in and out of blocking registry with the passage means,
    the clearance between each valve member and its receiving aperture being suffiicent to enable a film of injected material to be continuously extruded about the valve member under normal injection pressures when the valve member is in a flow obstructing position.

3. The injection manifold of claim 2 further characterized in that the maximum clearance between each valve and its receiving aperture is on the order of about .003".

4. The injection manifold of claim 2 further characterized in that the area of the manifold generally axially opposite the entry portion of the passage is formed and adapted to contact an abutment carried by the machine.

5. In an injection molding machine,
    a platen having a plurality of apertures therein, each aperture being of a size sufficient to receive an injection nozzle assembly,
    an injection manifold having an entering passage and a plurality of exit passages each communicating with the entering passage, each exit passage being disposed in a position to be generally aligned with an injection nozzle assembly carried by the platen,
    an abutment member interposed between the platen and the manifold,
    said abutment member being substantially longitudinally aligned with the axis of the entering passage of the manifold and having an abutment surface disposed substantially perpendicularly to the axis of said entering passage, and
    means for securing the manifold to the platen to thereby urge the manifold into tight, abutting engagement with the injection assembly.

6. The structure of claim 5 further characterized in that the platen is recessed in the area generally aligned with the entering passage of the manifold, and further including
    a support block received within the platen recess,
    said abutment member being carried by the support block,
    said abutment member being a bolt having a large head, the center of the bolt head being generally aligned with the longitudinal axis of the entering passage and means for maintaining the abutment member in abutting contact with the manifold when the relative positions of the abutment member and manifold change in response to temperature differentials.

References Cited by the Examiner
UNITED STATES PATENTS

| | | | |
|---|---|---|---|
| 2,501,595 | 3/1950 | Bohannon | 18—30 |
| 2,535,436 | 12/1950 | Maynard | 264—328 |
| 2,567,693 | 9/1951 | Brunner | 18—30 |
| 2,635,288 | 4/1953 | Watkins et al. | 18—30 |
| 2,871,516 | 2/1959 | Sherman et al. | 18—30 |
| 2,871,517 | 2/1959 | Allard | 18—30 |
| 3,032,810 | 5/1962 | Soubier | 18—30 XR |
| 3,059,277 | 10/1962 | Pierce et al. | 18—14 |
| 3,092,440 | 6/1963 | Rex et al. | 264—328 |
| 3,112,523 | 12/1963 | Goulet et al. | 18—30 XR |

J. SPENCER OVERHOLSER, *Primary Examiner.*

A. H. BRODMERCKEL, W. L. McBAY, J. R. DUNCAN, *Assistant Examiners.*